(12) United States Patent
Beamon et al.

(10) Patent No.: US 9,875,364 B2
(45) Date of Patent: *Jan. 23, 2018

(54) MULTI-FOCUSED FINE-GRAINED SECURITY FRAMEWORK

(71) Applicant: International Business Machines Corporation, Armonk, NY (US)

(72) Inventors: Bridget B. Beamon, Cedar Park, TX (US); Bradley M. Debroni, Victoria (CA); Octavian F. Filoti, Portsmouth, NH (US); Bryan J. Kyle, Victoria (CA); Christopher M. Nolan, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 14/722,410

(22) Filed: May 27, 2015

(65) Prior Publication Data

US 2016/0308902 A1 Oct. 20, 2016

Related U.S. Application Data

(63) Continuation of application No. 14/688,985, filed on Apr. 16, 2015.

(51) Int. Cl.
G06F 21/60 (2013.01)
H04L 29/06 (2006.01)
G06F 21/62 (2013.01)

(52) U.S. Cl.
CPC ........ *G06F 21/604* (2013.01); *G06F 21/6218* (2013.01); *H04L 63/08* (2013.01); *H04L 63/10* (2013.01); *H04L 63/20* (2013.01)

(58) Field of Classification Search
CPC ... G06F 21/604; G06F 17/30477; H04L 63/10
(Continued)

(56) References Cited

U.S. PATENT DOCUMENTS 5,581,682 A 12/1996 Anderson et al.
7,140,044 B2 11/2006 Redlich et al.
(Continued)

FOREIGN PATENT DOCUMENTS

WO 2014026235 2/2014

OTHER PUBLICATIONS

Gkoulalas-Divanis et al. "Toward smarter healthcare: Anonymizing medical data to support research studies," IBM Journal of Research and Development, Jan./Feb. 2014, vol. 58, Issue 1, p. 9:1-9:11.
(Continued)

*Primary Examiner* — Abu Sholeman
(74) *Attorney, Agent, or Firm* — VanLeeuwen & VanLeeuwen; William J. Stock

(57) ABSTRACT

An approach is provided in which a knowledge manager generates a knowledge structure that includes security annotation tokens and term tokens. Each of the security annotation tokens are stored in a parallel field and align to at least one of the term tokens. The knowledge manager matches security policies corresponding to a search request to one or more of the security annotation tokens and, in turn, generates search results based upon obfuscation of one or more of the term tokens aligned to the matched security annotation tokens.

6 Claims, 12 Drawing Sheets

(58) Field of Classification Search
USPC .................................................... 726/1
See application file for complete search history.

(56) References Cited

U.S. PATENT DOCUMENTS

| | | | |
|---|---|---|---|
| 7,571,151 B1* | 8/2009 | Fontaine | G06F 17/30569 |
| 8,132,242 B1* | 3/2012 | Wu | H04L 63/0884 |
| | | | 713/168 |
| 8,612,467 B2 | 12/2013 | Bernard | |
| 8,683,035 B2* | 3/2014 | Ahuja | H04L 43/18 |
| | | | 707/748 |
| 8,751,424 B1 | 6/2014 | Wojcik et al. | |
| 8,793,231 B2 | 7/2014 | Cragun et al. | |
| 8,811,612 B2 | 8/2014 | Gerraty | |
| 8,887,044 B1* | 11/2014 | Goodspeed | G06F 3/0483 |
| | | | 715/202 |
| 2002/0019941 A1* | 2/2002 | Chan | G06F 21/53 |
| | | | 713/185 |
| 2002/0099952 A1* | 7/2002 | Lambert | G06F 21/51 |
| | | | 726/27 |
| 2004/0054535 A1* | 3/2004 | Mackie | G10L 13/08 |
| | | | 704/260 |
| 2005/0119978 A1* | 6/2005 | Ates | G06Q 20/04 |
| | | | 705/67 |
| 2005/0223415 A1* | 10/2005 | Oho | G06F 21/606 |
| | | | 726/27 |
| 2006/0075228 A1* | 4/2006 | Black | H04L 63/0428 |
| | | | 713/167 |
| 2006/0100010 A1* | 5/2006 | Gatto | A63F 13/70 |
| | | | 463/29 |
| 2006/0294192 A1* | 12/2006 | Mao | H04L 67/306 |
| | | | 709/213 |
| 2007/0300306 A1* | 12/2007 | Hussain | G06F 21/6218 |
| | | | 726/27 |
| 2008/0072134 A1* | 3/2008 | Balakrishnan | G06F 17/278 |
| | | | 715/230 |
| 2009/0019155 A1* | 1/2009 | Krzanowski | H04L 12/14 |
| | | | 709/225 |
| 2009/0106271 A1 | 4/2009 | Chieu et al. | |
| 2009/0292687 A1* | 11/2009 | Fan | G06F 17/30654 |
| 2011/0184893 A1* | 7/2011 | Paparizos | G06F 17/30525 |
| | | | 706/12 |
| 2012/0078890 A1* | 3/2012 | Fan | G09B 7/00 |
| | | | 707/723 |
| 2012/0084293 A1* | 4/2012 | Brown | A61B 5/00 |
| | | | 707/741 |
| 2012/0278339 A1* | 11/2012 | Wang | G06F 17/30241 |
| | | | 707/748 |
| 2013/0007701 A1* | 1/2013 | Sundararam | G06F 8/30 |
| | | | 717/109 |
| 2013/0262089 A1* | 10/2013 | Whitman | G06F 17/278 |
| | | | 704/9 |
| 2013/0262449 A1* | 10/2013 | Arroyo | G06F 17/30442 |
| | | | 707/722 |
| 2013/0282363 A1* | 10/2013 | Fan | G06F 17/2872 |
| | | | 704/9 |
| 2014/0007186 A1 | 1/2014 | Agrawal et al. | |
| 2014/0074637 A1* | 3/2014 | Hammad | G06Q 20/12 |
| | | | 705/21 |
| 2014/0136941 A1 | 5/2014 | Avrahami et al. | |
| 2015/0081321 A1* | 3/2015 | Jain | G06F 19/3456 |
| | | | 705/2 |
| 2015/0134635 A1* | 5/2015 | Gupta | G06F 17/30867 |
| | | | 707/709 |
| 2015/0269234 A1* | 9/2015 | Castellanos | G06F 17/30563 |
| | | | 707/602 |
| 2015/0378687 A1* | 12/2015 | Malnati | G06F 8/70 |
| | | | 717/110 |
| 2016/0028737 A1* | 1/2016 | Srinivasan | H04L 63/102 |
| | | | 726/1 |
| 2016/0171092 A1* | 6/2016 | Mueller | G06N 5/022 |
| | | | 707/741 |
| 2016/0241594 A1* | 8/2016 | Boyette | H04L 63/20 |
| 2016/0300020 A1* | 10/2016 | Wetta | G06Q 50/24 |
| 2016/0306984 A1* | 10/2016 | Amarendran | G06F 21/6218 |
| 2016/0371253 A1* | 12/2016 | Boxwell | G06F 17/2785 |

OTHER PUBLICATIONS

Beamon et al., "Multi-Focused Fine-Grained Security Framework," U.S. Appl. No. 14/688,985, filed Apr. 16, 2015, 51 pages.

* cited by examiner

Knowledge Structure 370

| Pos. | Original Text Term (Term Location Inf.) | Pos Inc | ENTITY ANNOTATION TYPE | Pos Inc | SECURITY ANNOTATION TYPE | Pos Inc |
|---|---|---|---|---|---|---|
| 0 | US (0,2) | 1 | COUNTRY (0,2) | 1 | S(0,104) — 665 | 1 |
| 1 | Navy (3,7) | 1 | ORGANIZATION (3,13) | 1 | | |
| 2 | Seals (8,13) | 1 | | | | |
| 3 | will (14,18) | 1 | | | | |
| 4 | attack (19,25) | 1 | | | | |
| 5 | ISIS (26,30) | 1 | ORGANIZATION (26,36) | 4 | | |
| 6 | group (31,36) | 1 | | | | |
| 7 | at (37,39) | 1 | | | | |
| 8 | 10AM (40,44) | 1 | TIME (40,44) | 3 | TS (40,58) — 670 | 8 |
| 9 | Monday (45,51) | 1 | DATE (45,58) | 1 | | |
| 10 | Feb (52,55) | 1 | | | | |
| 11 | 16 (56,58) | 1 | | | | |
| 12 | at (59,61) | 1 | | | | |
| 13 | an (62,64) | 1 | | | | |
| 14 | undisclosed (65,76) | 1 | LOCATION (65,85) | 5 | | |
| 15 | location (77,85) | 1 | | | | |
| 16 | in (86,88) | 1 | | | | |
| 17 | Benghazi, (89,97) | 1 | LOCATION (89,104) | 3 | TS (89,104) — 675 | 9 |
| 18 | Libya (99,104) | 1 | | | | |

*FIG. 6*

Original Passage 800

Progression: Stage 4A

Patient Name: Sue Liu

810 — DOB: 07-22-79
SSN: 456-76-3456
DL: TX 124521
Insurance Name, Policy: ABC Insurance Summary:

820 — Patient is a 35 year old Asian female now in stage 4A of Adenocarcinma cervical cancer. Initial diagnosis was made on Feb 1, 2014. The disease has now progressed to stage 4A. Treatment is chemotherapy. Patient has been advised that radiotherapy and/or radical surgery may be needed See history for details.

History:

830 — Feb 1, 2014 - Patient complained of occasionally abdominal pains and feelings of sickness.
Weight: 114 BP 120/80
Treatment recommended: non, return in 1 month
Note - There are no visible signs. Pap was clear. The patient appears to be in good health other than what was stated.
---------
August 12, 2014- Patient has returned with the same complaints of pain occurring more frequently. Now insists bloating. Blood is now significantly higher than normal. Some weight gain. Abnormal Pap.
Weight: 118 BP: 140/90
Recommending a cervical biopsy
Note - The patient did not return in the recommended 1 month, but unfortunately has waited 6 months. Waiting on biopsy for diagnosis.
--------
August 22, 2014 - Biopsy revealed cancerous tissues. Diagnosis is Adenocarcinoma. Treatment recommended: Chemotherapy. Patient has been advised that radiation and/or surgery may be needed or later.

*FIG. 8*

Views 900

Primary Doctor View 910

Progression: Stage 4A

Patient Name: Sue Liu
DOB: 07-22-79
SSN: ▮
DL: ▮
Insurance Name, Policy: ▮

Summary:
Patient is a 35 year old Asian female now in stage 4A of Adenocarcinma cervical cancer. Initial diagnosis was made on Feb 1, 2014. The disease has now progressed to stage 4A. Treatment is chemotherapy. Patient has been advised that radiotherapy and/or radical surgery may be needed See history for details.

History:
Feb 1, 2014 - Patient complained of occasionally abdominal pains and feelings of sickness.
Weight: 114 BP 120/80
Treatment recommended: none, return in 1 month
Note - There are no visible signs. Pap was clear. The patient appears to be in good health other than what was stated.
----------
August 12, 2014- Patient has returned with the same complaints of pain occurring more frequently. Now insists bloating. Blood is now significantly higher than normal. Some weight gain. Abnormal Pap.
Weight: 118 BP: 140/90
Recommending a cervical biopsy
Note - The patient did not return in the recommended 1 month, but unfortunately has waited 6 months. Waiting on biopsy for diagnosis.
--------
August 22, 2014 - Biopsy revealed cancerous tissues. Diagnosis is Adenocarcinoma.
Treatment recommended: Chemotherapy.
Patient has been advised that radiation and/or surgery may be needed or later.

Medical Researcher View 920

Progression: Stage 4A

Summary:
Patient is less than 50 years old. Asian female now in stage 4A of cervical cancer. Treatment is chemotherapy. Patient has been advised that radiotherapy and/or radical surgery may be needed See history for details.

History:
Patient complained of occasionally abdominal pains and feelings of sickness.
Weight: 114 BP 120/80
Treatment recommended: none, return in 1 month
----------
Six months later - Patient has returned with the same complaints of pain occurring more frequently. Now insists bloating. Blood is now significantly higher than normal. Some weight gain. Abnormal Pap.
Recommending a cervical biopsy
--------
August 22, 2014 - Biopsy revealed cancerous tissues. Diagnosis is Cervical cancer.
Treatment recommended: Chemotherapy.
Patient has been advised that radiation and/or surgery may be needed or later.

Billing Administrator View 940

Progression: Stage 4A

Patient Name: Sue Liu
DOB: 07-22-79
SSN: 456-76-3456
DL: TX 124521
Insurance Name, Policy: ABC Insurance Feb 1, 2014 - Treatment recommended: none.
----------
August 12, 2014- Recommending a cervical biopsy
--------
August 22, 2014 - Treatment recommended: Chemotherapy.

MULTI-FOCUSED FINE-GRAINED SECURITY FRAMEWORK

BACKGROUND

Document security is a generic term that describes protecting documents from unauthorized users. Traditionally, a document creator may password protect a document as a simple approach to prevent unauthorized viewing. Using this traditional approach, a user may enter the correct password and view the entire document. Otherwise, the user is prohibited from viewing any portion of the document.

Information retrieval and question answering systems ingest documents from many sources to create a knowledge base from which to obtain results. The documents may have varying levels of classification depending upon the domain of the knowledge base. For example, a corporate or military knowledge base may include confidential, secret, and top secret documents. In another example, a medical knowledge base may include medical documents with sensitive patient information such as social security numbers, insurance information, etc.

Information retrieval and question answer systems add annotations to documents as a way to incorporate metadata, entity information, or additional knowledge into searches to improve information recall and answering precision. Software developers may link annotations to documents using a variety of approaches, such as by storing the annotations as metadata at a document level, storing the annotations in separate structured resources, or modifying the document by embedding the annotations directly into the document.

BRIEF SUMMARY

According to one embodiment of the present disclosure, an approach is provided in which a knowledge manager generates a knowledge structure that includes security annotation tokens and term tokens. Each of the security annotation tokens are stored in a parallel field and align to at least one of the term tokens. The knowledge manager matches security policies corresponding to a search request to one or more of the security annotation tokens and, in turn, generates search results based upon obfuscation of one or more of the term tokens that align to the matched security annotation tokens.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 6 is an exemplary diagram depicting a knowledge structure that a knowledge manager generates from a preprocessed document;

FIG. 8 is an exemplary diagram depicting a medical document that includes sensitive patient information;

FIG. 9 is an exemplary diagram depicting various views of a patient's documentation based upon a requestor's credentials;

DETAILED DESCRIPTION

Figure 1:
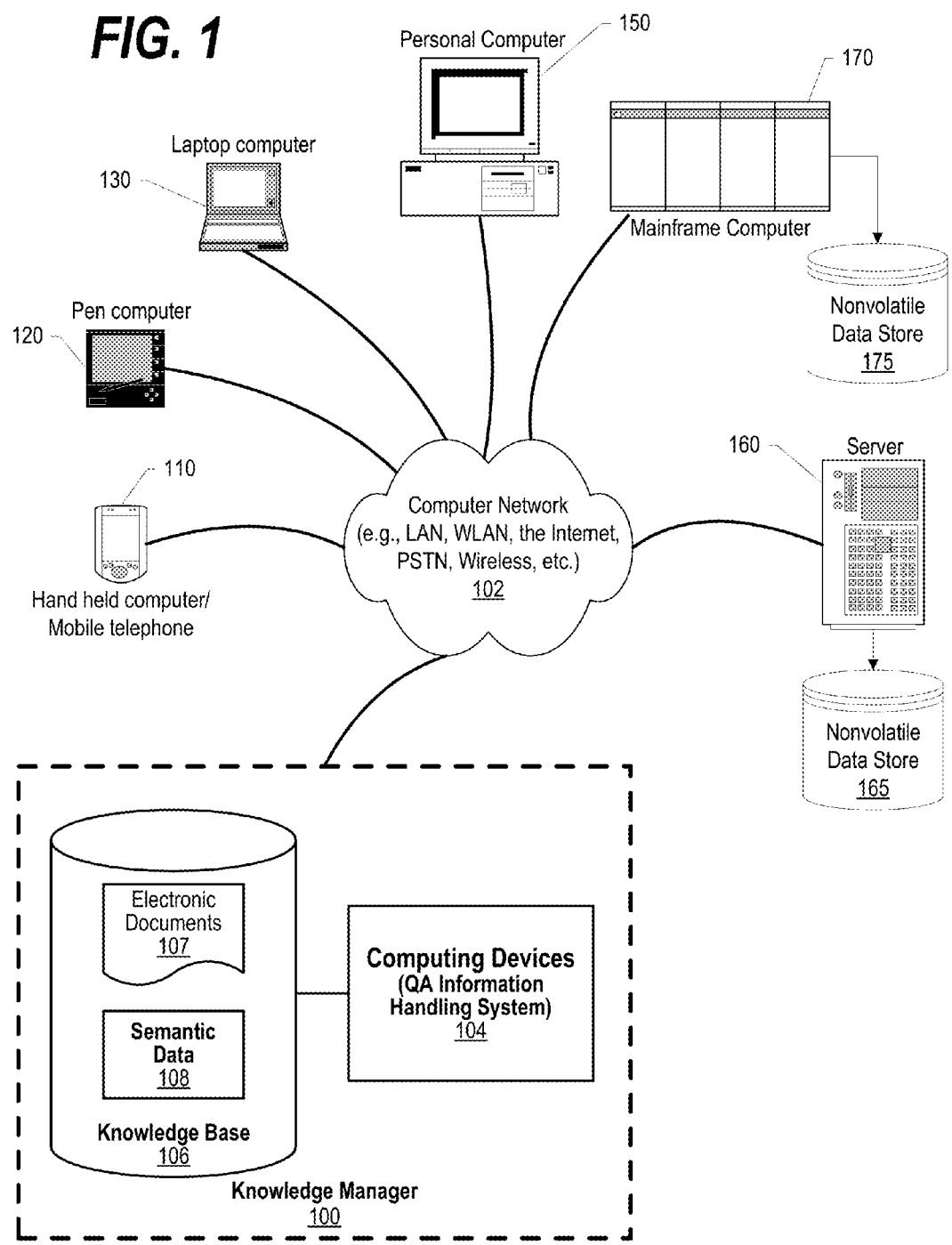
FIG. 1 depicts a schematic diagram of one illustrative embodiment of a knowledge manager system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, possible answer-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing possible answer information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
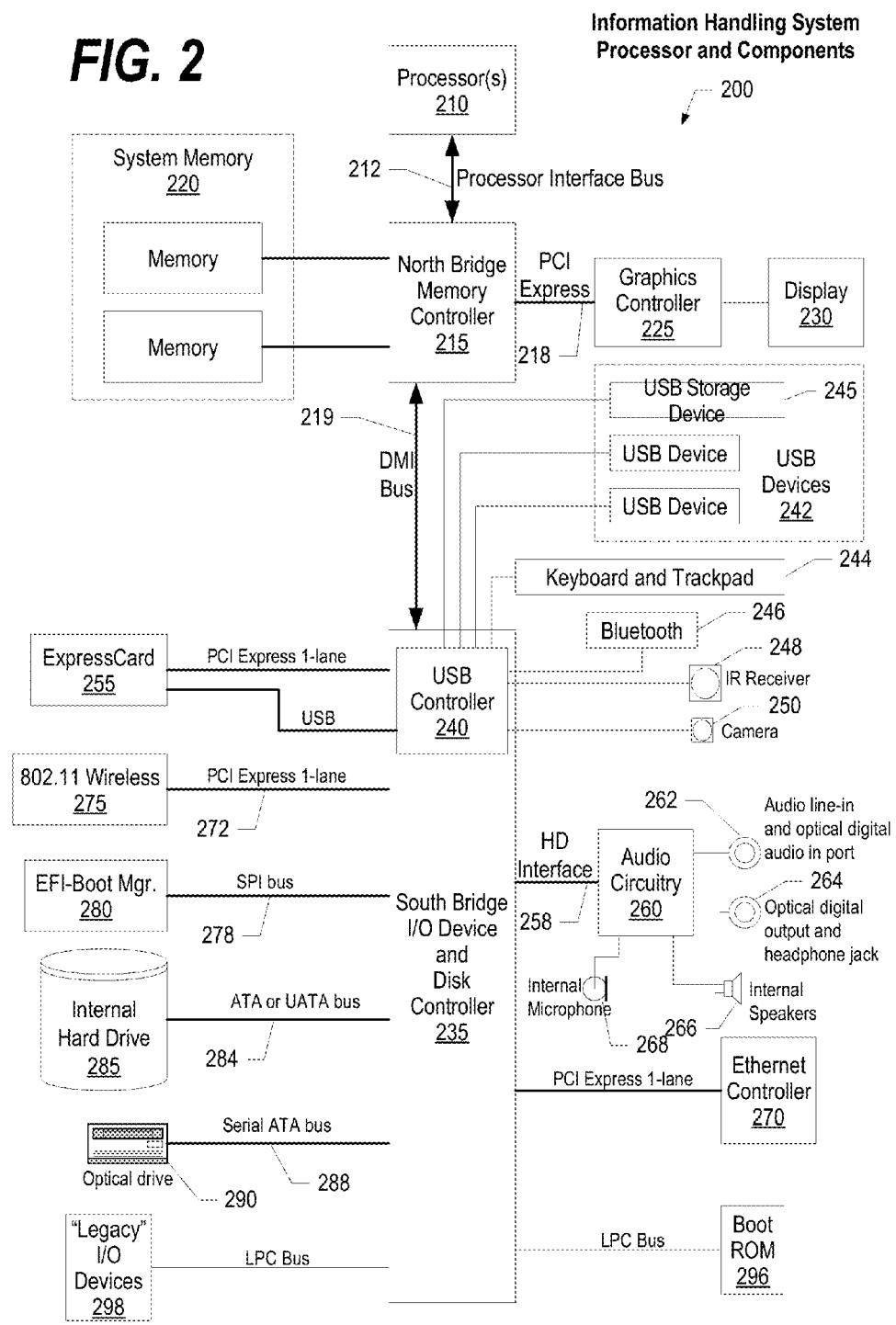
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-12 depict an approach that can be executed on an information handling system. The information handling generates term tokens from terms included in original source documents, and generates security annotation tokens based upon security policies corresponding to the original source document. The information handling system generates a knowledge structure that includes original text fields and parallel fields that align to the original text fields. The term tokens are stored in the original text fields and the security annotation tokens are stored in the corresponding parallel fields. In turn, the information handling system provides an optimized and fine-grained security framework for securing document portions using the security annotation tokens while providing full term resolution.

In one embodiment, the information handling system provides multiple points of obfuscation, such as during persistence, processing, and visualization. As such, the information handling system may retrieve and analyze sensitive information without breaking security policies. In another embodiment, the information handling system provides the fine-grained security framework for structured, unstructured, or hybrid data embodiments.

Figure 3:
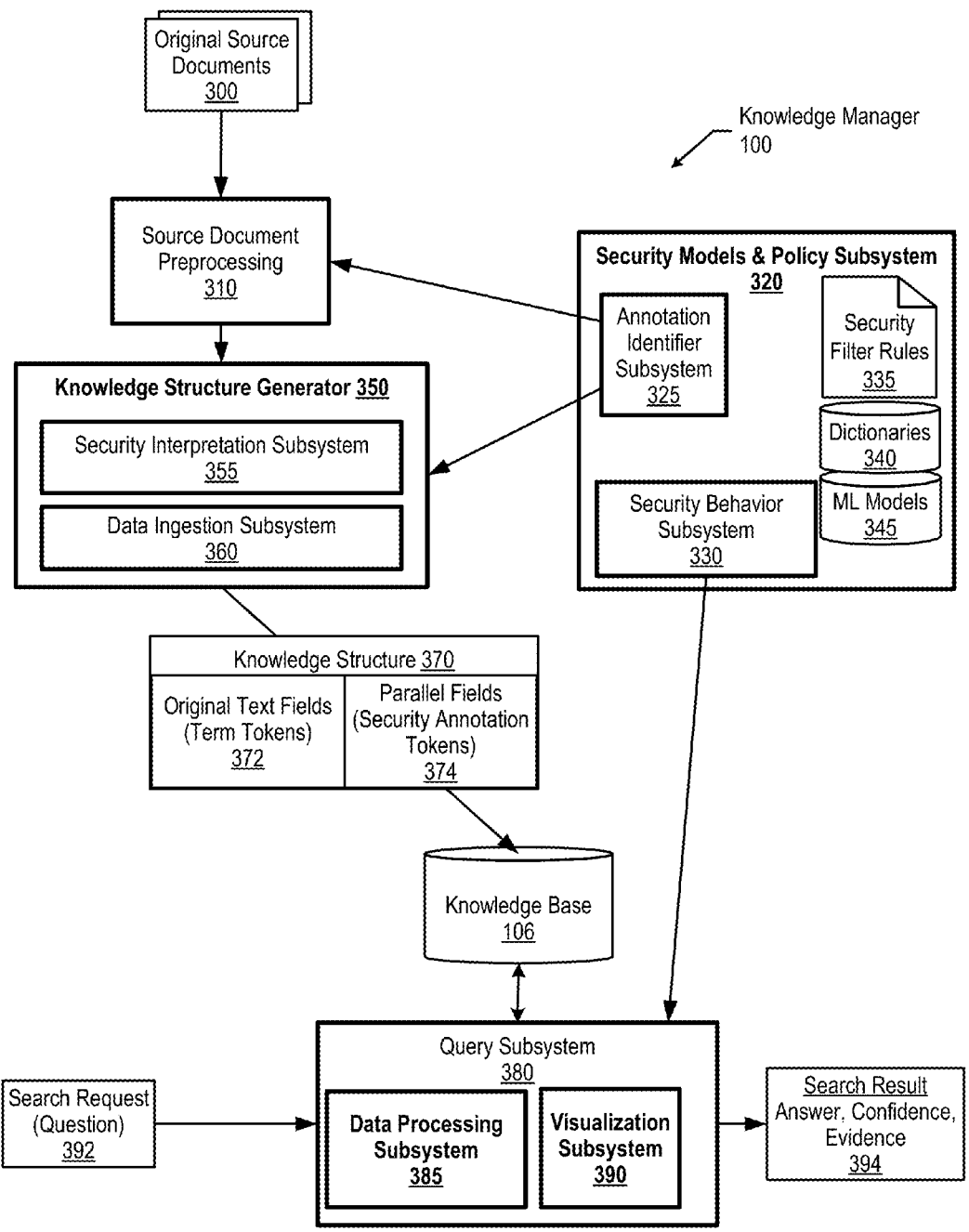
FIG. 3 is an exemplary diagram depicting a knowledge manager that creates a knowledge structure which includes security annotation tokens aligned to term tokens, and uses the knowledge structure to provide fine-grained filtered results by matching the security tokens to security policies.

FIG. 3 is an exemplary diagram depicting a knowledge manager that creates a knowledge structure which includes security annotation tokens aligned to term tokens, and uses the knowledge structure to provide fine-grained filtered results by matching the security tokens to security policies. FIG. 3 shows various subsystems of knowledge manager 100, such as source document preprocessing 310, security models and policy subsystem 320, knowledge structure generator 350, and query subsystem 380. Those skilled in the art can appreciate that knowledge manager 100 may include more, less, or different subsystems than what is shown in FIG. 3. In addition, as discussed herein, knowledge manager 100 may be an information retrieval system, a question answer system, or other type of system that receives a request and provides results for the request.

Figure 5:
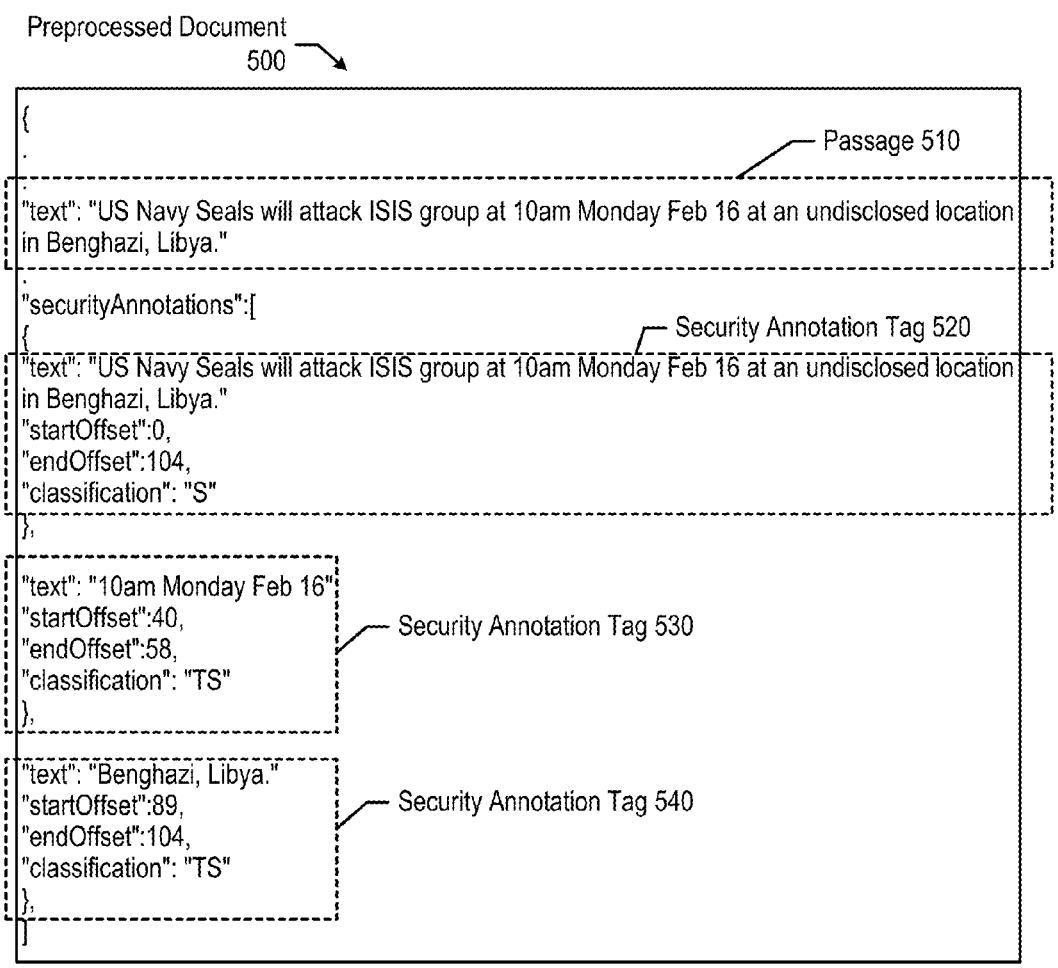
FIG. 5 is an exemplary diagram depicting a document processed by a source document preprocessing subsystem.

Knowledge manager 100 uses source document preprocessing 310 to format original source documents 300 into an acceptable format. Referring to FIG. 5, source document preprocessing 310 may add specific security annotation tags 520, 530, and 540 based upon information provided by security models and policy subsystem 320. Particularly, annotation identifier subsystem 325 may determine locations at which to apply annotations in the original source documents and add parallel fields accordingly. In one embodiment, based on information from the security policies stored in security filter rules 335, dictionaries 340, and machine-learning models 345, knowledge manager 100 identifies annotations of interest (relations, concepts, etc.) at both ingestion stage (via source document preprocessing 310) as well as during runtime (via query subsystem 380).

Knowledge manager 100 uses knowledge structure generator 350 to generate term tokens from terms (e.g., words) included in original source documents 300 and index the term tokens into original text fields 372. The term tokens include term location information, such as span and offset information, for their corresponding terms (see FIG. 6 and corresponding text for further details).

Knowledge structure generator 350 also includes security interpretation subsystem 355 and data ingestion subsystem 360. Security interpretation subsystem 355 interprets the security annotation tags generated by source document preprocessing 310 and identifies parallel fields in which to store corresponding security annotation tokens. In one embodiment, security interpretation subsystem 355 converts the security annotation tags into security annotation tokens that include a security level and a location. For example, referring to FIG. 6, security annotation token 670 indicates that original text from character offsets 40 through 58 is classified as "TS" (Top Secret).

Data ingestion subsystem 360 organizes the original text fields in original source documents 300, along with parallel field information (includes security annotation tokens), into knowledge structure 370. Knowledge structure 370 includes original text fields 372 that store term tokens, and corresponding parallel fields 374 that store security annotation tokens (see FIG. 6 and corresponding text for further details). As such, knowledge manager 100 may filter unaltered original text from original source documents 300 down to a word level by matching security policies with the security annotation tokens stored in the parallel fields (see FIGS. 6, 7, and corresponding text for further details). In one embodiment, knowledge structure generator 350 utilizes a specific algorithm to align positions and offsets of multiple annotation tokens to the term tokens. Knowledge structure generator 350 stores knowledge structure 370 in knowledge base 106 for subsequent utilization by query subsystem 380 (discussed below).

Query subsystem 380 receives search request 392 and determines a set of annotations/annotation types and a set of terms for which to search. Security behavior subsystem 330 provides security filter rules to query subsystem 380 based upon, for example, a user's credentials. In one embodiment, security behavior subsystem 330 is an abstract runtime controller that instructs query subsystem 380 how to process accessed data that has security annotations.

In this embodiment, query subsystem 380 may send security behavior subsystem 330 a section of data (e.g., document) with security annotations and security behavior subsystem 330 returns an allowed behavior to query subsystem 380, such as whether to include the section of data in a primary search. In another embodiment, security behavior subsystem 330 may modify the document according to the security policies and security annotation tokens and return the modified document to query subsystem 380 for analysis.

In one embodiment, data processing subsystem 385 generates sub queries for the various annotation types (entity, security, etc.) and aggregates the sub queries into a complex query that factors in a desired set of parameters such as relative annotation positions, weightings, etc. In another embodiment, each sub query uses annotation-specific information, such as varying slop values (the number of non-relevant terms allowed between query terms), annotation-specific boosting for each parallel field, and differing required or optional terms. In this embodiment, the sub queries are then nested or combined to form the complex query.

Visualization subsystem 390 interacts with security behavior subsystem 330 to obfuscate specific terms or phrases that align to security annotation tokens matching security policies. For example, a doctor may access a patient's medical history, but the doctor does not "need to know" the patient's insurance information. As such, visualization subsystem 390 may mask the patient's insurance information and provide search result 394 with the masked information (see view 910 in FIG. 9 and corresponding text for further details).

Figure 4:
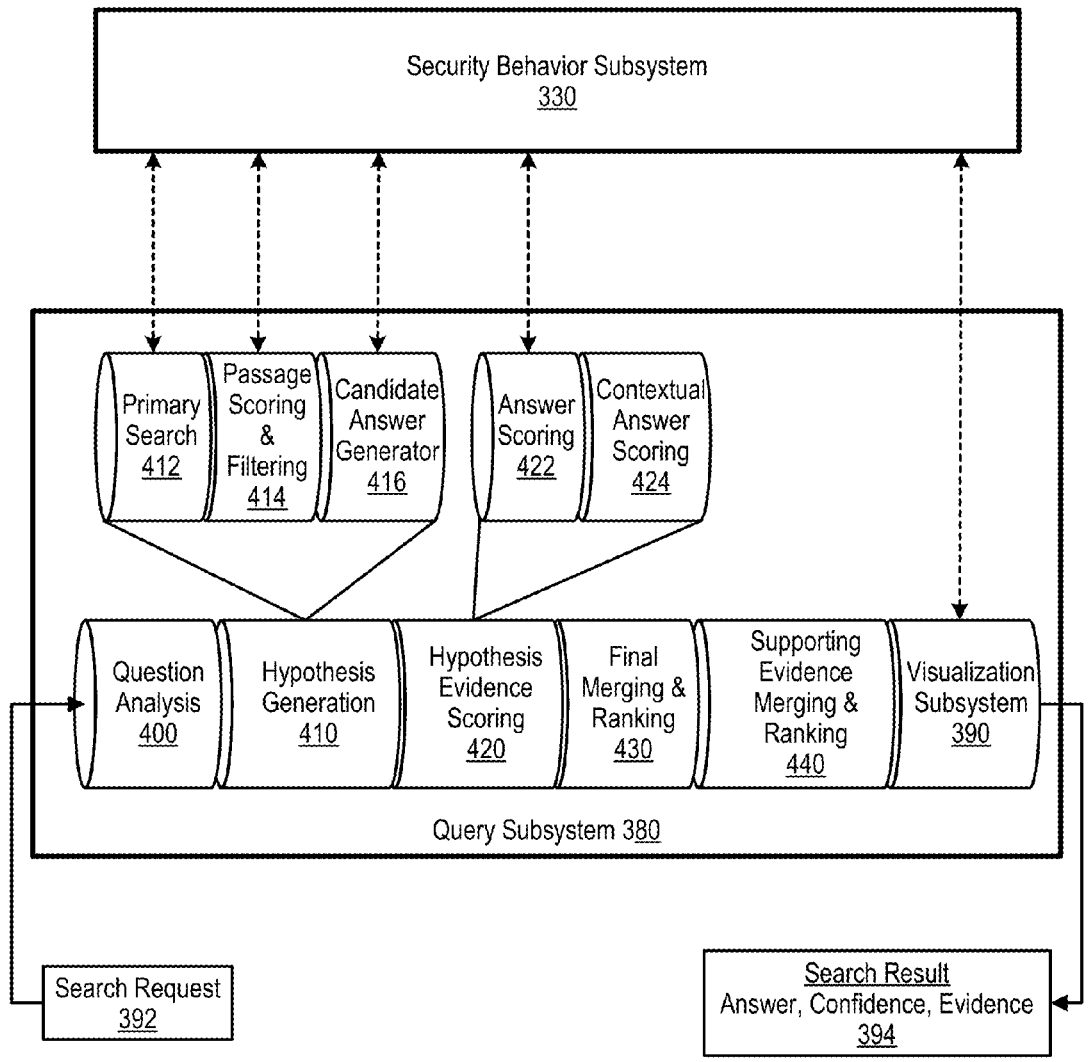
FIG. 4 is an exemplary diagram depicting a query subsystem interfacing with a security behavior subsystem to provide filtered answers to a search request.

FIG. 4 is an exemplary diagram depicting a query subsystem interfacing with a security behavior subsystem to provide filtered answers to a search request. Query subsystem 380 receives search request 392 and performs question analysis 400 on the question. For example, the question analysis may perform natural language processing on the request to understand the context of search request 392.

Hypothesis generation 410 uses the outcome of question analysis 400 to perform primary search 412, passage scoring and filtering 414, and candidate answer generation 416. Primary search 412, in conjunction with security behavior subsystem 330, searches knowledge base 106 using the security annotation tokens stored in parallel fields to provide a "pre-flight" constraint capability to restrict portions of text available for searching. For example, if phrases in a document are classified as Top Secret but a user has a Secret clearance, primary search 412 may omit the Top Secret phrases from the overall search when generating candidate answers. In another embodiment, knowledge manager 100 may unencrypt encrypted passages or phrases during primary search 412 if the user has appropriate credentials.

Passage scoring and filtering 414, in conjunction with security behavior subsystem 330, filters and ranks passages for consideration as sources for answers based upon scoring restriction policies. For example, knowledge manager 100 may not score passages, or portions of passages, based on scoring restriction policies provided by security behavior subsystem 330 compared against security annotation tokens stored in the parallel fields. IN addition, candidate answer generator 416 may remove candidate answers derived from unauthorized passages based upon the stored security annotation tokens relative to security policies provided by security behavior subsystem 330.

Hypothesis evidence scoring 420 receives candidate answers from hypothesis generation 410, and performs answer scoring 422 using security behavior subsystem 330 in a manner similar to that of passage scoring and filtering 414 discussed above. In turn, query subsystem 380 performs contextual answer scoring 424 to score candidate answers based on their contextual content.

Final merging and ranking 430 ranks the candidate answers, which feed into supporting evidence merging and ranking 440. Supporting evidence merging and ranking 440, in one embodiment, identifies actual passages stored in knowledge manager 106 that correspond to the candidate answers. As such, in one embodiment, visualization generation 450 obfuscates various terms, phrases, etc. of the actual passages and/or supporting evidence according to visualization authorization security policies provided by security behavior subsystem 330, resulting in search result 394. For example, query subsystem 380 may not change the ranking of displayed answers, but may replace unauthorized content in an answer with a security warning, such as filtered answer 720 shown in FIG. 7.

FIG. 5 is an exemplary diagram depicting a document processed by a source document preprocessing subsystem. Preprocessed document 500 includes passage 510 from an original source document 300. During preprocessing, the knowledge manager identifies security annotations corresponding to passage 510 and stores the security annotations as security annotation tags 520, 530, and 540 discussed below.

Security annotation tag 520 indicates that the entire passage 510 is classified as "Secret". For example, the knowledge manager may have identified an overall classification of the corresponding source document on the front page of the document. Security annotation tag 530 indicates that specific details of a time and date of an attack are classified as "Top Secret." For example, annotation identifier subsystem 325 may use security filter rules 335, one of which specifying that times and dates should be classified at one security level higher than the overall classification of a source document. Likewise, security annotation 540 indicates that specific details of the location of the attack are also classified as "Top Secret."

As such, the knowledge manager (e.g., knowledge structure generator 350) analyzes preprocessed document 500 and generates a knowledge structure that query subsystem 380 utilizes to answer requests (shown in FIG. 6).

FIG. 6 is an exemplary diagram depicting a knowledge structure that knowledge manager 100 generates from preprocessed document 500. Knowledge structure 370 includes columns 610, 620, 630, 640, 650, 660, and 680. As those skilled in the art can appreciate, knowledge structure 370 may have other formats such as a data array, a database, or other type of structure that allows annotation tokens to align with term tokens at a term position resolution.

Column 610 includes a list of term positions of original text. The example shown in FIG. 6 corresponds to a first sentence in a document. As such, the first term "US" is located at the first position. Column 620 includes original text fields 372 and corresponding term tokens. Each term token includes a term and character offset information that indicates the term location in the original text stream. Column 630 includes a list of position increments that indicate the number of positions between the term tokens. Each of the position increments are "1" because a term token is stored in each original text field position.

Column 640 includes a set of parallel fields that store annotation tokens of annotation type "Entity" and align to their corresponding text token in column 620. Each annotation token includes an annotation and term location information that, as shown in the first position, may encompass more than one term token. As can be seen in position 1, the annotation token ORGANIZATION aligns with character offsets 3 through 13, which includes both the "Navy" term token and the "Seals" term token.

Column 650 includes a list of position increments corresponding to the annotation tokens in column 640 that indicate the number of positions between annotation tokens. For example, the position increment in column 650 for position 8 is "3" because the TIME ENTITY is three positions away from ORGANIZATION (position 5).

Column 660 includes parallel fields 374 that include security annotation tokens. Security annotation token 665 corresponds to security annotation 520 in FIG. 5, which indicates character offsets 0 through 104 (entire passage) are classified as "S," or Secret. Security token 670 corresponds to security annotation 530 in FIG. 5, which indicates character offsets 40 through 58 are classified as "TS," or Top Secret. Referring to column 620, character offsets 40 through 58 include "10 AM Monday February 16."

Likewise, security token 680 corresponds to security annotation 540 in FIG. 5, which indicates character offsets 89 through 104 are classified as "TS," or Top Secret. Referring to column 620, character offsets 89 through 104 include "Benghazi, Libya." Column 680 includes a list of position increments corresponding to the security annotation tokens in column 660, which indicate the number of positions between the security annotation tokens similar to column 650 as discussed above.

In one embodiment, knowledge structure 370 may include columns for other annotation types, such as concept annotation types (e.g., canonical name of an entity), sentiment annotation types, geospatial coordinate annotation types, syntactic-relationship structure annotation types (e.g., subject-object-predicate relationships), and co-references annotation types (e.g., pronoun resolution).

Figure 7:
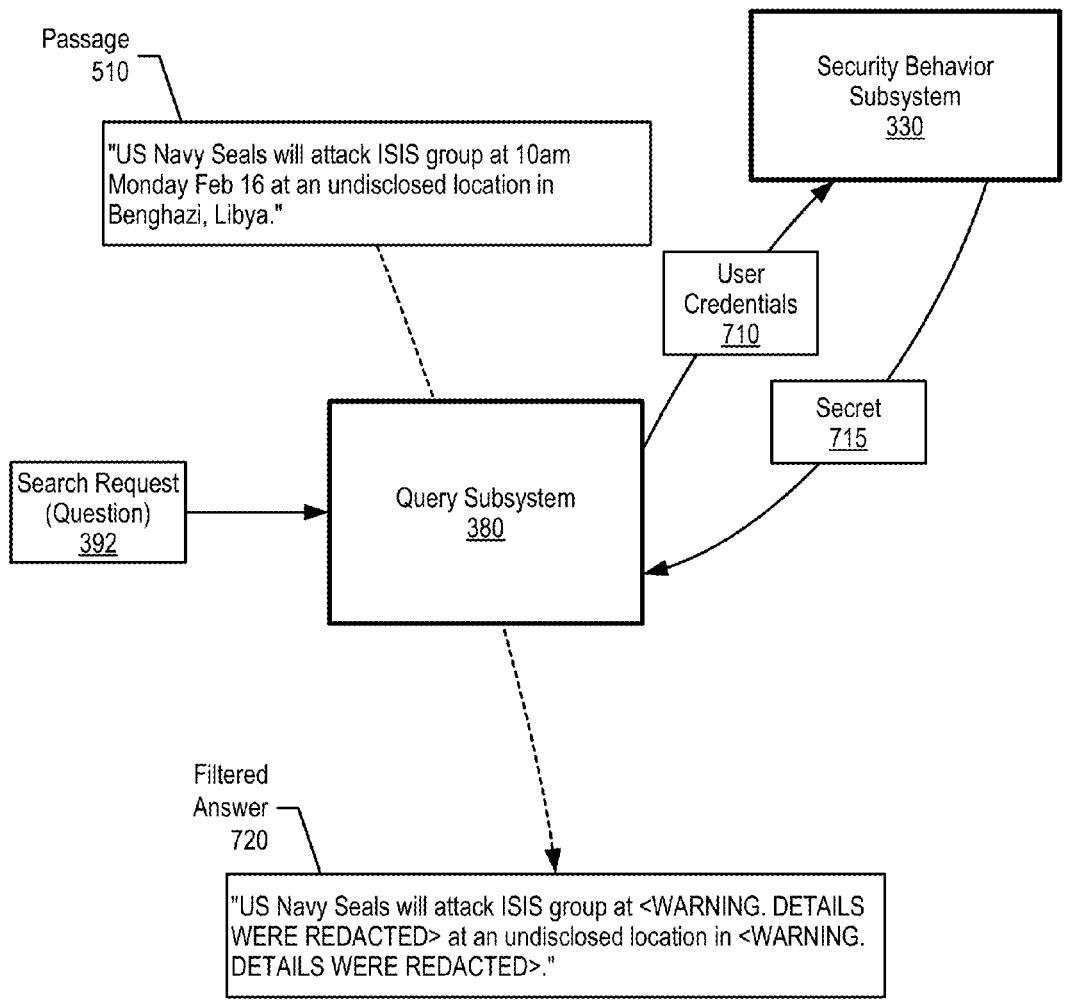
FIG. 7 is an exemplary diagram depicting a query subsystem providing a term-specific filtered answer to a search request.

FIG. 7 is an exemplary diagram depicting a query subsystem providing a term-specific filtered answer to a search request. Query subsystem 380 receives search request 392 and, subsequent to identifying candidate answers and scoring the candidate answers, query subsystem 380 determines that passage 510 corresponds to a candidate answer. Query subsystem 380 sends user credentials 710 to security behavior subsystem 330, which returns a "Secret" clearance 715 for the corresponding user. Therefore, the user is not preview to phrases within passage 510 having a "Top Secret" classification. As such, and referring to FIG. 5, query subsystem 380 filters the two Top Secret phrases in character offsets 40-58 (time and date) and 89-104 (location).

In turn, query subsystem 380 generates filtered answer 720 that includes a portion of passage 510 that the user is cleared to view and a portion of text that is obfuscated with security warnings. By providing filtered answer 720 to the user instead of filtering the entire document, the user is aware that documentation is available that includes more detailed information that the user is not cleared to view. As a result, the user may inform a superior officer, whom has a Top Secret clearance, of the documentation that, in turn, may submit a separate query and view the entire contents of passage 510.

In one embodiment, query subsystem 380 provides search results on a need-to-know basis. In this embodiment, if a user has proper clearance but does not have a reason to know particular sections of information, query subsystem 380 filters the answer accordingly. For example, query subsystem 380 may receive security information from security behavior subsystem 330 that indicate a requesting user's need to know criteria, such as whether the user belongs to a particular department or project.

FIG. 8 is an exemplary diagram depicting a medical document that includes a patient's sensitive information. Original passage 800 includes personal information 810, medical summary 820, and medical history 830 corresponding to a patient. Typically, a portion of original passage 800 is relevant to a requesting user based upon the requesting user's role. For example, a doctor requires medical history 830 but may not require some of personal information 810. Conversely, a billing department requires a patient's personal information but may not necessarily require medical history 830.

As such, knowledge manager 100 adds security annotation tokens to original passage 800 in parallel fields as discussed herein in order for knowledge manager 100 to provide a fine-grained security framework that generates relevant and authorized information to various requestors. For example, knowledge manager 100 may associate "Billing" security annotation tokens to a patient's social security number, driver's license number, and insurance information, and may associate "Doctor" security annotation tokens to the patient's medical history. In turn, knowledge manager 100 provides different views of original passage 800 to different requestors based upon the requestor's role (see FIG. 9 and corresponding text for further details).

FIG. 9 is an exemplary diagram depicting various views of a patient's documentation based upon a requestor's credentials. Views 900 include three different views of original passage 800, which are each based upon the requestor's credentials compared with security annotation tokens stored in parallel fields relative to term tokens in original passage 800.

Primary doctor view 910 includes obfuscated personal information such as the patient's social security number, driver's license number, and insurance policy information. In other words, security annotation tokens corresponding to the patient's social security number, driver's license number, and insurance policy information indicate that their corresponding term tokens are not viewable to a doctor. Referring to FIG. 4, visualization subsystem 390 may receive obfuscation information (visualization security policies) from security behavior subsystem 330 to mask term tokens that are not authorized for a doctor's view.

Medical researcher view 920 includes information corresponding to the requesting user being a medical researcher. As can be seen, medical researcher view 920 omits the patient's personal information, including the patient's name. In addition, medical researcher view 920 generalizes various summary information such as the patient is "less than 50 years old" instead of stating the patient's exact age as shown in original passage 800. Furthermore, medical researcher view 920 summarizes sections of the patient's medical history into concise paragraphs. In one embodiment, knowledge manager 100 generates the summary text during ingestion and includes the summary text with the ingested original passage 800. Then, based on the user's clearance level, knowledge manager 100 shows a detailed view, a summary view, or masks portions of text accordingly.

Billing administrator view 940 includes personal information and treatment information required for billing purposes. As can be seen, billing administrator view 940 does not include all of the patient's medical history required by a doctor, but provides enough information to bill the patient and/or the patient's insurance company.

Figure 10:
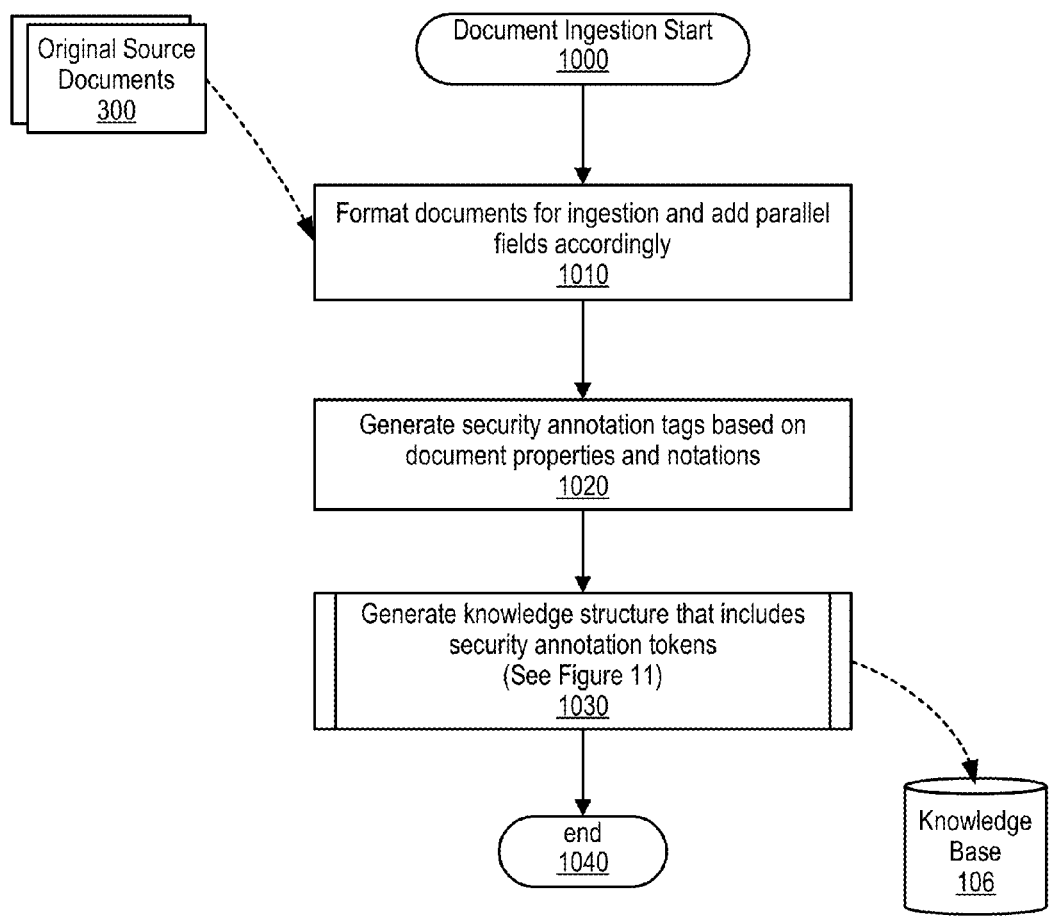
FIG. 10 is an exemplary flowchart depicting steps taken by a knowledge manager to add security annotation tokens into parallel fields during document ingestion and generate a searchable knowledge structure.

FIG. 10 is an exemplary flowchart depicting steps taken by a knowledge manager to add security annotation tokens into parallel fields during document ingestion to generate a searchable knowledge structure. Processing commences at 1000, whereupon, at step 1010, the process formats original source documents 300 for ingestion and creates parallel fields accordingly.

At step 1020, the process generates security annotation tags based on document properties and notations. In one embodiment, the process identifies security annotations within original source documents 300, such as "Secret" marked on the top of each page of a document. In another embodiment, the process identifies security annotation areas within an original source document based upon security filter rules, dictionaries, etc., such as identifying times, dates, locations within classified documents. Referring to FIG. 5, the process generates security annotation tags 520, 530, and 540 corresponding to a document that includes passage 510.

At predefined process 1030, the process generates a knowledge structure that includes security annotation tokens in parallel fields and stores the knowledge structure in knowledge base 106. For example, referring to FIG. 6, the process adds security annotation token 675 into position 17's parallel field because security annotation tag 540 from FIG. 5 includes a start offset of 89, which corresponds to position 17's starting position in FIG. 6 (see FIG. 11 and corresponding text for processing details). FIG. 10 processing thereafter ends at 1040.

Figure 11:
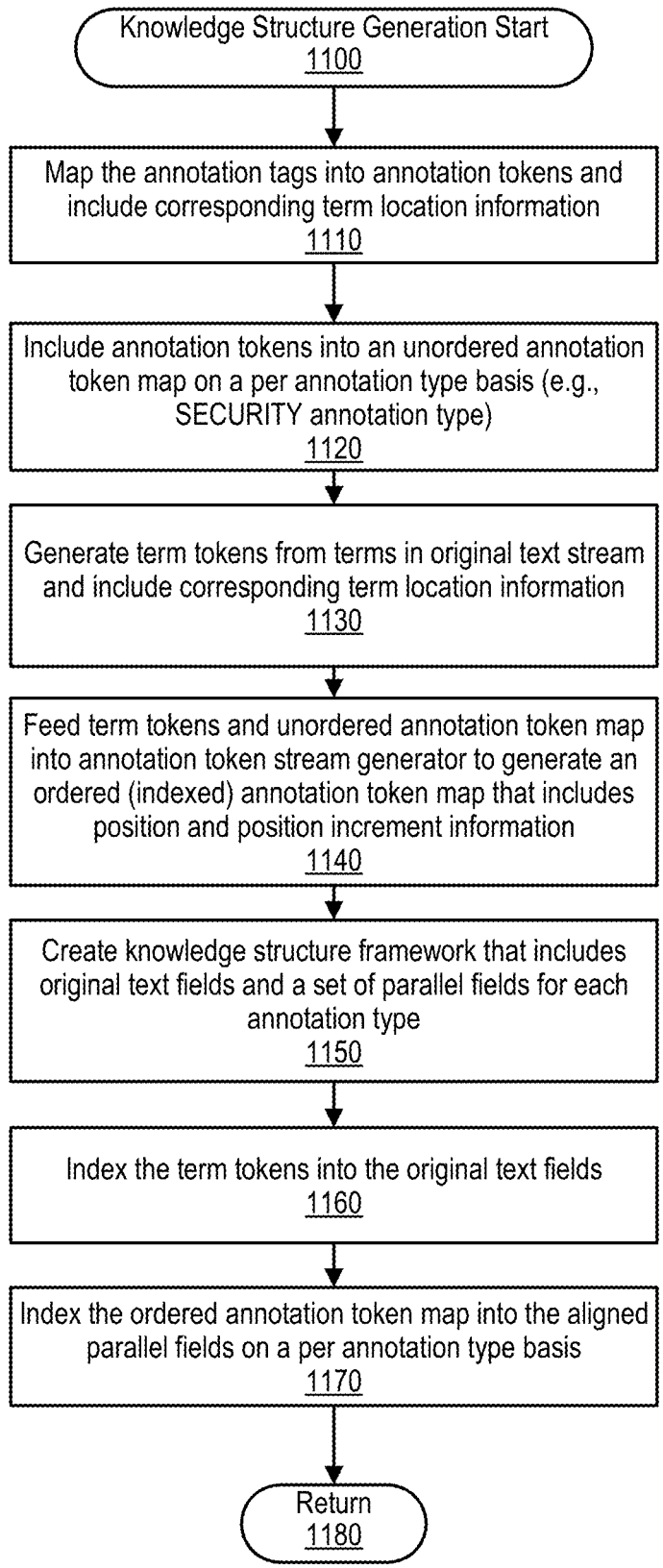
FIG. 11 is a flowchart showing steps taken by a knowledge manager to generate a knowledge structure using original text and corresponding annotations.

FIG. 11 is a flowchart showing steps taken by a knowledge manager to generate a knowledge structure using original text and corresponding annotations. In one embodiment, the original text is an original text stream extracted from a document, such as during a document ingestion stage.

Processing commences at 1100, whereupon the process maps incoming security annotation tags with corresponding term location information (e.g., spans and character offsets) into security annotation tokens. For example, the process maps security annotation tag 530 in FIG. 5 to security annotation token 670 in FIG. 6.

At step 1120, the process includes the security annotation tokens into an unordered annotation token map on a per annotation type basis (e.g., security annotation type). At step 1130, the process generates term tokens from an original text stream generated from an original source document (e.g., term tokens shown in column 620 in FIG. 6). In one embodiment, each term corresponds to a word in the original text stream and the term tokens include the term location information corresponding to the location of the term within the original text stream. At step 1140, the process feeds the term tokens and the unordered security annotation token map into an annotation token stream generator to generate an ordered annotation token map.

At step 1150, the process creates a knowledge structure framework that includes original text fields and a set of parallel fields for each annotation type, such as knowledge structure 370 shown in FIG. 6. At step 1160, the process indexes the term tokens into the original text fields and, at step 1170, the process indexes the ordered annotation token map into their respective parallel fields. As such, the parallel fields are aligned to the original text fields based upon the term location information, thus providing the annotations with term position resolution for post processing tasks such as for retrieving original text that corresponds to annotation token query matches. FIG. 11 processing thereafter returns to the calling routine (FIG. 10) at 1180.

Figure 12:
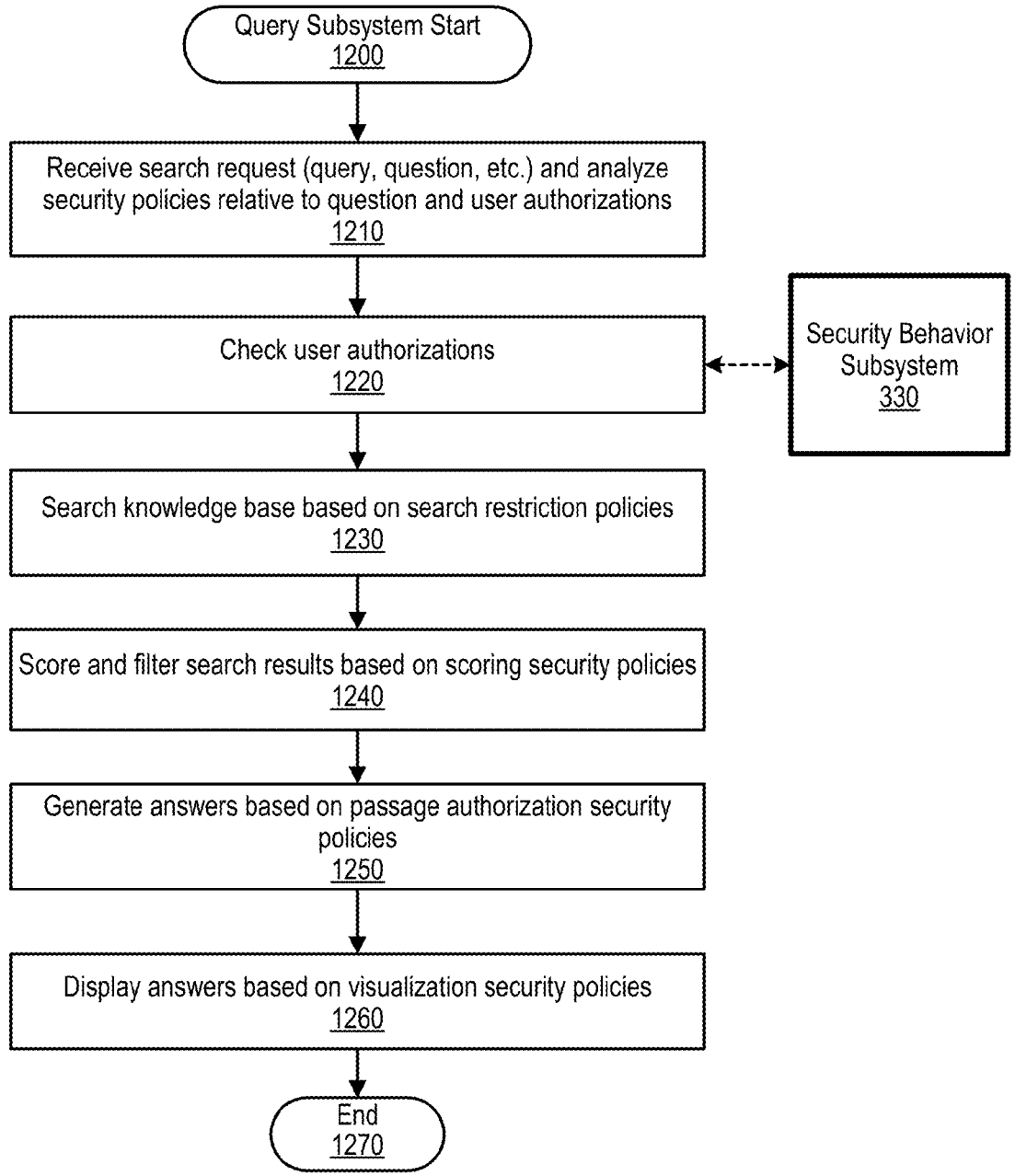
FIG. 12 is an exemplary flowchart showing steps taken in processing a search request and filtering a document based upon the documents' security annotation tokens stored in a set of parallel fields.

FIG. 12 is an exemplary flowchart showing steps taken in processing a search request and filtering a document based upon the document's security annotation tokens stored in a set of parallel fields. Processing commences at 1200, whereupon, at step 1210, the process receives a search request (query, question, etc.) and analyzes security policies from security behavior subsystem 330 relative to the question and user authorizations. In one embodiment, the search request may be a question that the knowledge manager analyzes using techniques such as natural language processing to understand the context and meaning of the question. In this embodiment, the knowledge manager may generate a search request based upon the results of question analysis.

At 1220, the process checks user authorizations with security behavior subsystem, such as security level, need-to-know criteria, etc. At step 1230, the process searches knowledge base 106 based on search restriction policies. In one embodiment, a search restriction policy restricts portions of the text (term tokens) available to be searched upon. Depending on the role of a person requesting a search, the knowledge manager may omit passages in the knowledge base from being searched. Referring to FIG. 4, primary search 412 searches knowledge base 106 based upon search restriction policies provided by security behavior subsystem 330. In one embodiment, the process creates sub queries for each annotation type corresponding to the annotation search sets and creates a sub query for the term search sets. In this embodiment, the process applies a desired set configuration, such as adding weighting to particular annotations, terms, etc., and may include relative position requirements that require annotation tokens to be within a certain position offset from each other. In turn, the process nests or aggregates the sub queries into a complex query according to the desired set configuration.

At step 1240, the process scores and filters the search results in part based on scoring security policies (e.g., passage scoring and filtering 414 shown in FIG. 4). In one embodiment, the process filters and ranks passages in the knowledge base for consideration as sources for answers based on the scoring security policies.

At step 1250, the process generates answers based on passage authorization security policies (e.g., candidate answer generator 416 and answer scoring 422 shown in FIG. 4). For example, the process may delete candidate answers derived from unauthorized passages before continuing final merger and subsequent pipeline processing steps.

The process, at step 1260, displays answers based on visualization security policies, such as by using visualization generator 450 shown in FIG. 4. Referring to view 940 in FIG. 9, view 940 corresponds to a billing administrator whom requires a patient's billing information but does not require the patient's detailed medical history information. As such, view 940 provides the billing administrator with pertinent billing information and a high-level medical information, but omits the detail medical information. FIG. 12 processing thereafter ends at 1260.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
assigning a plurality of security annotation tags to at least one document in a corpus of electronic documents based upon one or more document properties corresponding to the at least one document;
building, by a processor, an electronic knowledge structure from the corpus of electronic documents, wherein the building further comprises:
generating a plurality of term tokens and storing the plurality of term tokens in a plurality of text fields, wherein the plurality of term tokens correspond to a plurality of terms included in the corpus of documents;
generating a plurality of security annotation tokens based on the plurality of security annotation tags and storing the plurality of security annotation tokens in a plurality of parallel fields that correspond to the plurality of text fields, wherein each of the plurality of security annotation tokens indicate a security level of one of the plurality of term tokens stored in the corresponding one of the plurality of text fields; and
storing the electronic knowledge structure in a memory;
matching, by the processor, one or more security policies corresponding to a search request to one or more of the plurality of security annotation tokens, wherein the search request is received over a computer network;
identifying, by the processor, a first subset of the plurality of term tokens that correspond to the matched one or more of the plurality of security annotation tokens and identifying a second subset of the plurality of term tokens not corresponding to the matched one or more of the plurality of security annotation tokens; and
generating, by the processor, one or more answers to the search request, wherein at least one of the one or more answers provides the second set of term tokens and obfuscates the first subset of term tokens.

2. The method of claim 1 further comprising:
determining that at least one of the one or more security policies is a search restriction policy corresponding to the matched one or more security annotation tokens; and
omitting the first subset of term tokens during a search of the electronic knowledge structure.

3. The method of claim 1 further comprising:
determining that at least one of the one or more security policies is a scoring restriction policy corresponding to the matched one or more security annotation tokens; and
omitting the first subset of term tokens during a scoring of one or more search results corresponding to the one or more answers.

4. The method of claim 1 further comprising:
determining that at least one of the one or more security policies is a passage authorization security policy corresponding to the matched one or more security annotation tokens; and
deleting one or more candidate answers based upon the passage authorization security policy.

5. The method of claim 1 further comprising:
determining that at least one of the one or more security policies is a visualization security policy corresponding to the matched one or more security annotation tokens; and
displaying a modified one of the one or more answers that masks one or more of the first subset of term tokens.

6. The method of claim 5 further comprising:
replacing the masked one or more of the first subset of term tokens with one or more security warning messages.

* * * * *